US008696188B2

(12) United States Patent
Chang et al.

(10) Patent No.: US 8,696,188 B2
(45) Date of Patent: Apr. 15, 2014

(54) BACKLIGHT MODULE, LIGHT GUIDE DEVICE, AND METHOD FOR MANUFACTURING LIGHT GUIDE PLATE

(75) Inventors: Wei-Tien Chang, Hsin-Chu (TW); Chih-Chin Hsieh, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 257 days.

(21) Appl. No.: 13/327,864

(22) Filed: Dec. 16, 2011

(65) Prior Publication Data
US 2012/0163033 A1    Jun. 28, 2012

(30) Foreign Application Priority Data
Dec. 28, 2010   (TW) ................................ 99146389 A

(51) Int. Cl.
*F21V 7/10*        (2006.01)
(52) U.S. Cl.
USPC ......................................... 362/625; 362/626
(58) Field of Classification Search
USPC ......................................... 362/623, 625, 626
See application file for complete search history.

(56) References Cited

U.S. PATENT DOCUMENTS

| 7,131,764 B2* | 11/2006 | Hsu et al. ...................... 362/623 |
| 2007/0103938 A1* | 5/2007 | Chang et al. ................... 362/617 |
| 2007/0189039 A1* | 8/2007 | Yokota .......................... 362/619 |
| 2010/0091520 A1 | 4/2010 | Liao |

FOREIGN PATENT DOCUMENTS

| CN | 1567050 | 1/2005 |
| CN | 1758074 | 4/2006 |
| CN | 2862089 | 1/2007 |
| CN | 101017217 | 8/2007 |
| CN | 101382254 | 3/2009 |
| TW | M264504 | 5/2005 |

* cited by examiner

*Primary Examiner* — David V Bruce
(74) *Attorney, Agent, or Firm* — WPAT, PC; Justin King

(57) ABSTRACT

A method for manufacturing a light guide plate includes the following steps. At least one dot area and at least one non-dot area are defined on a mask. A lithography and etching process using the mask is performed a mold to form at least one recess having a rough surface on the mold and leave at least one non-etched microstructure on the mold. The recess corresponds to the non-dot area, and the non-etched microstructure corresponds to the dot area. An injection molding process using the mold is performed to form the light guide plate. The light guide plate has at least one protrusion having a rough surface on the light guide plate and at least one indented microstructure in the light guide plate. The protrusion corresponds to the recess, and the indented microstructure corresponds to the non-etched microstructure.

15 Claims, 8 Drawing Sheets

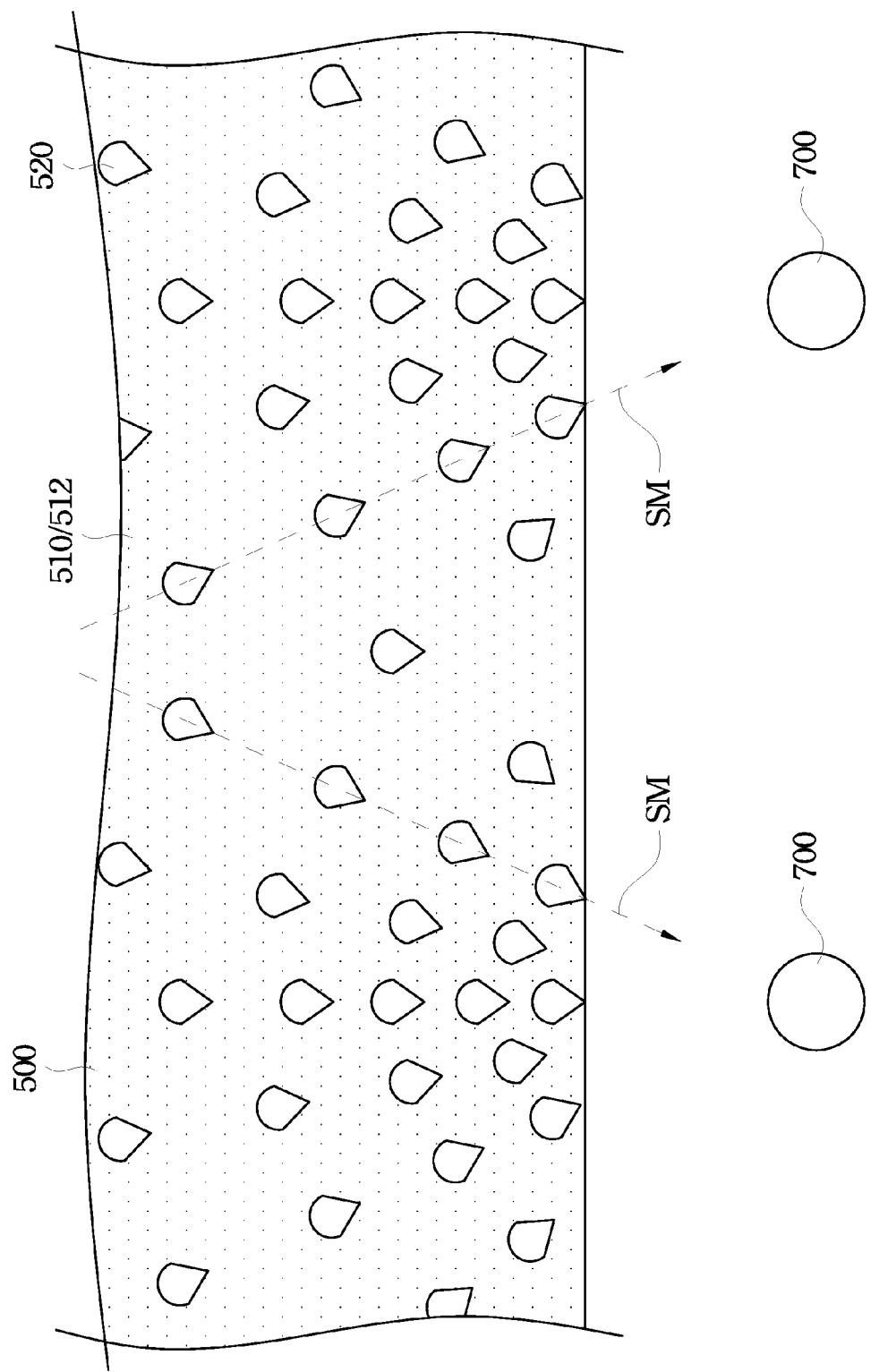

BACKLIGHT MODULE, LIGHT GUIDE DEVICE, AND METHOD FOR MANUFACTURING LIGHT GUIDE PLATE

RELATED APPLICATIONS

This application claims priority to Taiwan Application Serial Number 099146389, filed Dec. 28, 2010, which is herein incorporated by reference.

BACKGROUND

1. Technical Field

The present disclosure relates to light guide plates.

2. Description of Related Art

In recent years, the LCD which is widely used in PDA, the mobile phones, the ultra-thin light boxes, and the large outdoor screen (TV wall) has gradually replaced the cathode-ray tube and grows rapidly among the electronic displays. The LCD substantially includes the LCD panel displaying the image and the backlight module positioned behind the LCD panel. The backlight module mainly has a light source to emit light and the light guide plate for guiding light such that the light can irradiate the LCD panel. As the volume of LCD increases, the demand for the light guide plates used in the LCD backlight module also increases, which makes the light guide plate an important component in modern technology.

The process of the conventional injection-type light guide plate first converts designed dot area into the film mask, takes the film mask in the photolithography etching process, etches down the steel plate within the dot area, places the etched steel plate on the injection molding machine as the mother mold (master mold) after the etching process to perform the injection in order to produce the light guide plate.

However, as the brightness of the light emitting diode enhances, the number of the required light emitting diode decreases, and light splitting ability of the light guide plate produced with the conventional etching injection process is insufficient. As a result, the light can not be evenly distributed, and the dark points are easily occurred between the light-emitting diodes while the bright spots (Hot Spot Mura) are also produced in front of the light-emitting diodes.

SUMMARY

According to one embodiment of the present invention, a method for manufacturing a light guide plate includes the following steps. At least one dot area and at least one non-dot area are defined on a mask. A lithography and etching process using the mask is performed a mold to form at least one recess having a rough surface on the mold and leave at least one non-etched microstructure on the mold. The recess corresponds to the non-dot area, and the non-etched microstructure corresponds to the dot area. An injection molding process using the mold is performed to form the light guide plate. The light guide plate has at least one protrusion having a rough surface on the light guide plate and at least one indented microstructure in the light guide plate. The protrusion corresponds to the recess, and the indented microstructure corresponds to the non-etched microstructure.

According to another embodiment of the present invention, a light guide device includes a light guide plate and a reflector. The light guide plate has a light entrance surface, a light guiding surface, and at least one indented microstructure. The light guiding surface and the light entrance surface shares an edge of the light guide plate. The indented microstructure is disposed in the light guiding surface. At least a part of the light guiding surface surrounding the indented microstructure is rough. The reflector is disposed corresponding to the light guiding surface of the light guide plate.

According to still another embodiment of the present invention, a backlight module includes at least one light source and a light guide device. The light guide device includes a light guide plate and a reflector. The light guide plate has a light entrance surface, a light guiding surface, and at least one indented microstructure. The light entrance surface is opposite the light source. The light entrance surface and the light guiding surface share an edge of the light guide plate. The indented microstructure is disposed in the light guiding surface. At least a part of the light guiding surface surrounding the indented microstructure is rough. The reflector is disposed corresponding to the light guiding surface of the light guide plate.

BRIEF DESCRIPTION OF THE DRAWINGS

FIG. 6 is a bottom view of the light guide plate according to another embodiment of the present invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1A:
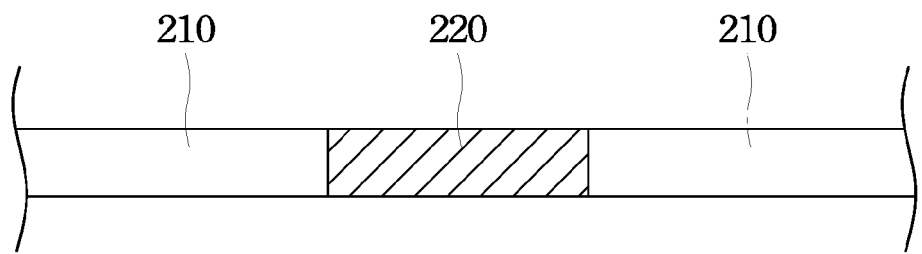
FIGS. 1A-1G are cross sectional views illustrating processes in a method for manufacturing a light guide plate.

FIGS. 1A-1G are cross sectional views illustrating processes in a method for manufacturing a light guide plate 500. The method for manufacturing the light guide plate 500 includes the following steps. As shown in FIG. 1A, at least one dot area 220 and at least one non-dot area 210 are defined on a mask 200.

Figure 1B:
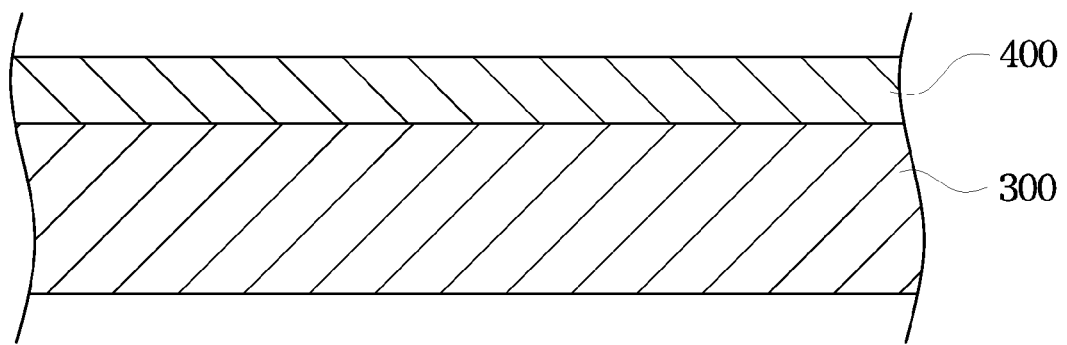
Figure 1C:
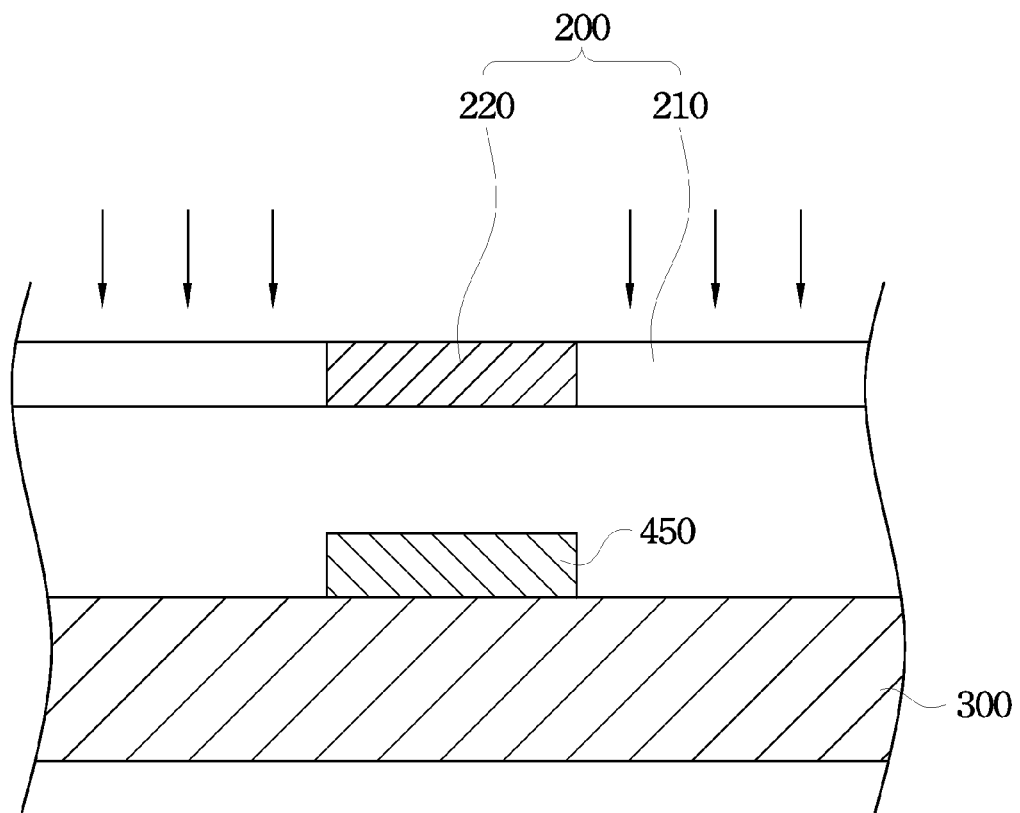
Figure 1D:
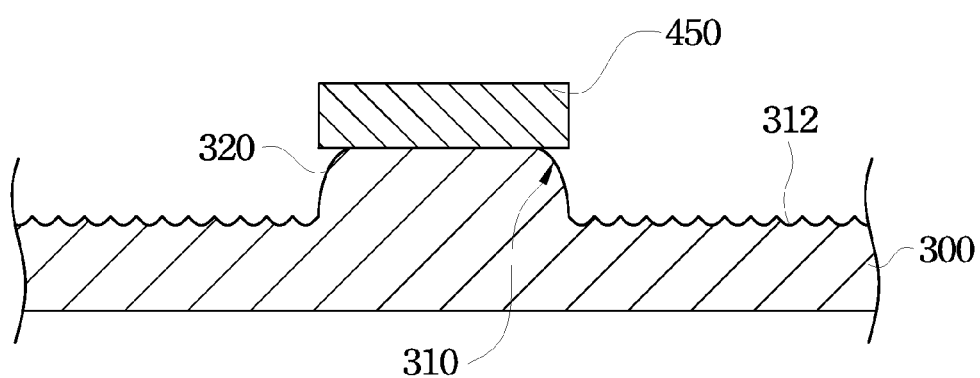
Figure 1E:
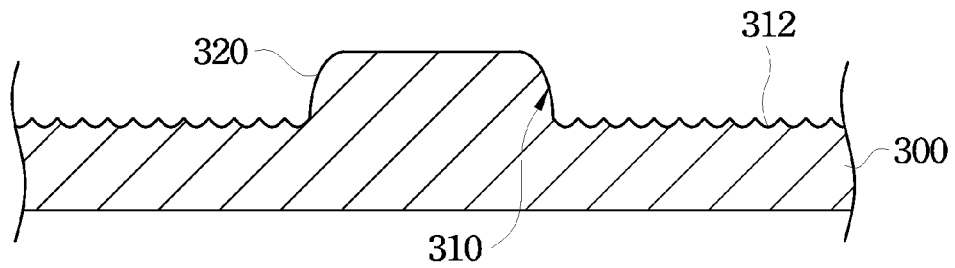

Then, a lithography and etching process using the mask 200 is performed a mold 300. Specifically, as shown in FIG. 1B, a photoresist layer 400 is formed on the mold 300. As shown in FIG. 1O, a lithography process using the mask 200 is performed to pattern the photoresist layer 400. As shown in FIG. 1D, an etching process using the patterned photoresist layer 450 as an etching mask is performed on the mold 300 to form at least one recess 310 having a rough surface 312 on the mold 300 and leave at least one non-etched microstructure 320 on the mold 300. The recess 310 corresponds to the non-dot area 210, and the non-etched microstructure 320 corresponds to the dot area 220. As shown in FIG. 1E, the patterned photoresist layer 450 is removed from the mold 300.

Figure 1F:
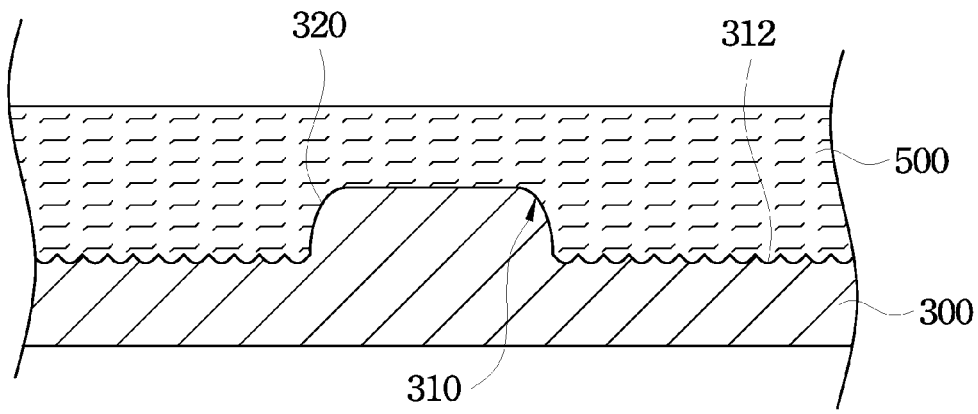

As shown in FIG. 1F, an injection molding process using the mold 300 is performed to form the light guide plate 500. In the injection molding process, melted plastic is forced to a mold cavity defined by the mold 300 and another mold, e.g. a female die, and then solidifies to form the light guide plate 500. Since the mold 300 has the non-etched microstructure 320 raised from the mold 300, the mold 300 can be directly used as a male die, and further casting is unnecessary.

Figure 1G:
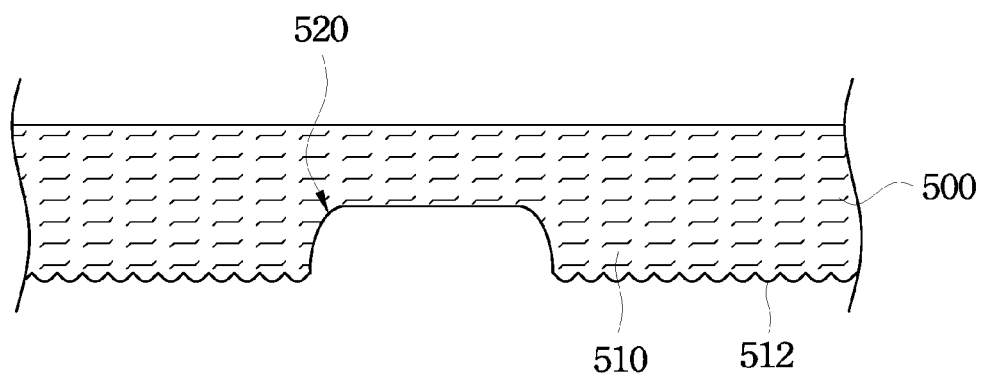

As shown in FIG. 1G, the light guide plate 500 is separated from the mold 300. The light guide plate 500 has at least one protrusion 510 and at least one indented microstructure 520. The protrusion 510 has a rough surface 512 and is disposed on the light guide plate 500. The protrusion 510 corresponds to the recess 310 (shown in FIG. 1F). The indented microstructure 520 is disposed in the light guide plate 500. The indented microstructure 520 corresponds to the non-etched microstructure 320 (shown in FIG. 1F).

Figure 2:
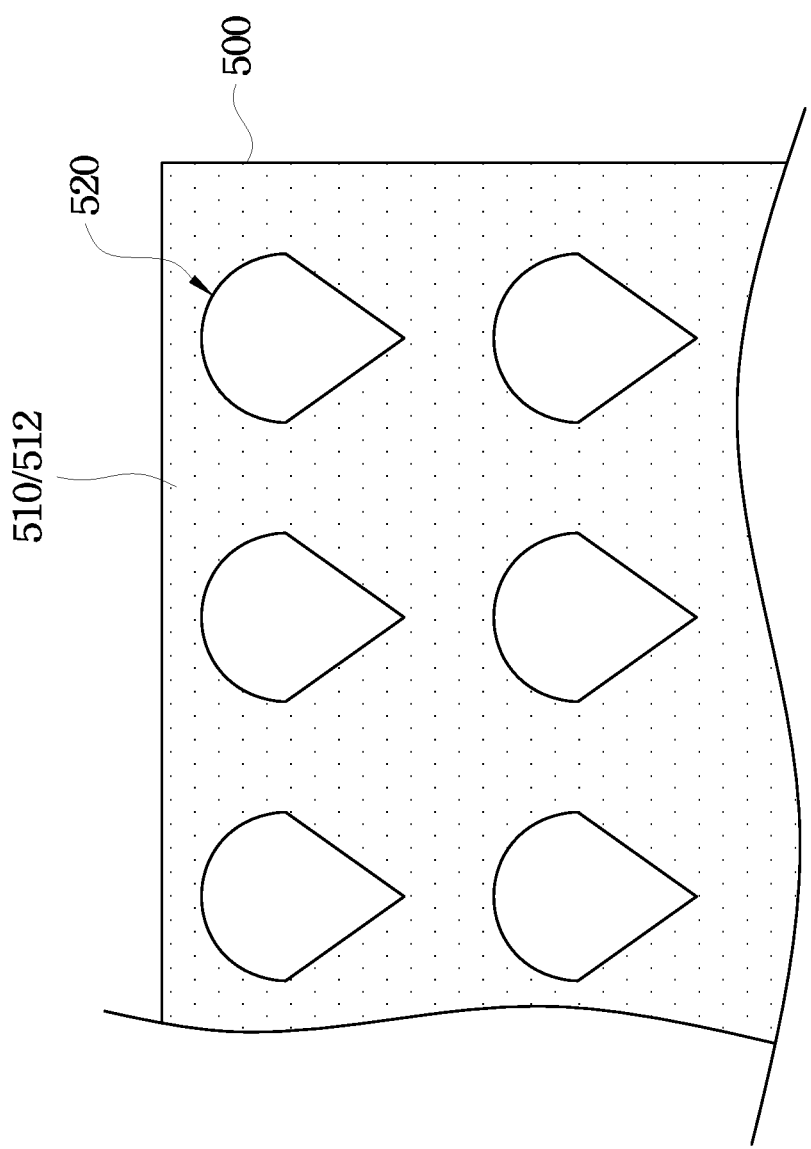
FIG. 2 is a bottom view of the light guide plate of FIG. 1G.

FIG. 2 is a bottom view of the light guide plate 500 of FIG. 1G. The indented microstructure 520 when viewed from the bottom of the light guide plate 500 is surrounded by the rough surface 512 of the protrusion 510. The method of the present embodiment uses a so-called inverse etching process, i.e. etching the recess 310 in the mold 300 and leaving the non-etched microstructure 320 seemingly raised above the surface of the mold 300, to make the rough surface 512. Light incident on the rough surface 512 is widely scattered. Therefore, hot spots and dark spots can be reduced. Furthermore, the indented microstructure 520 has the ability to totally internally reflect a part of light. Therefore, the light form a light source can be transported further with minimum loss, and thus the light output efficiency of the light guide plate 500 can be enhanced.

Figure 3:
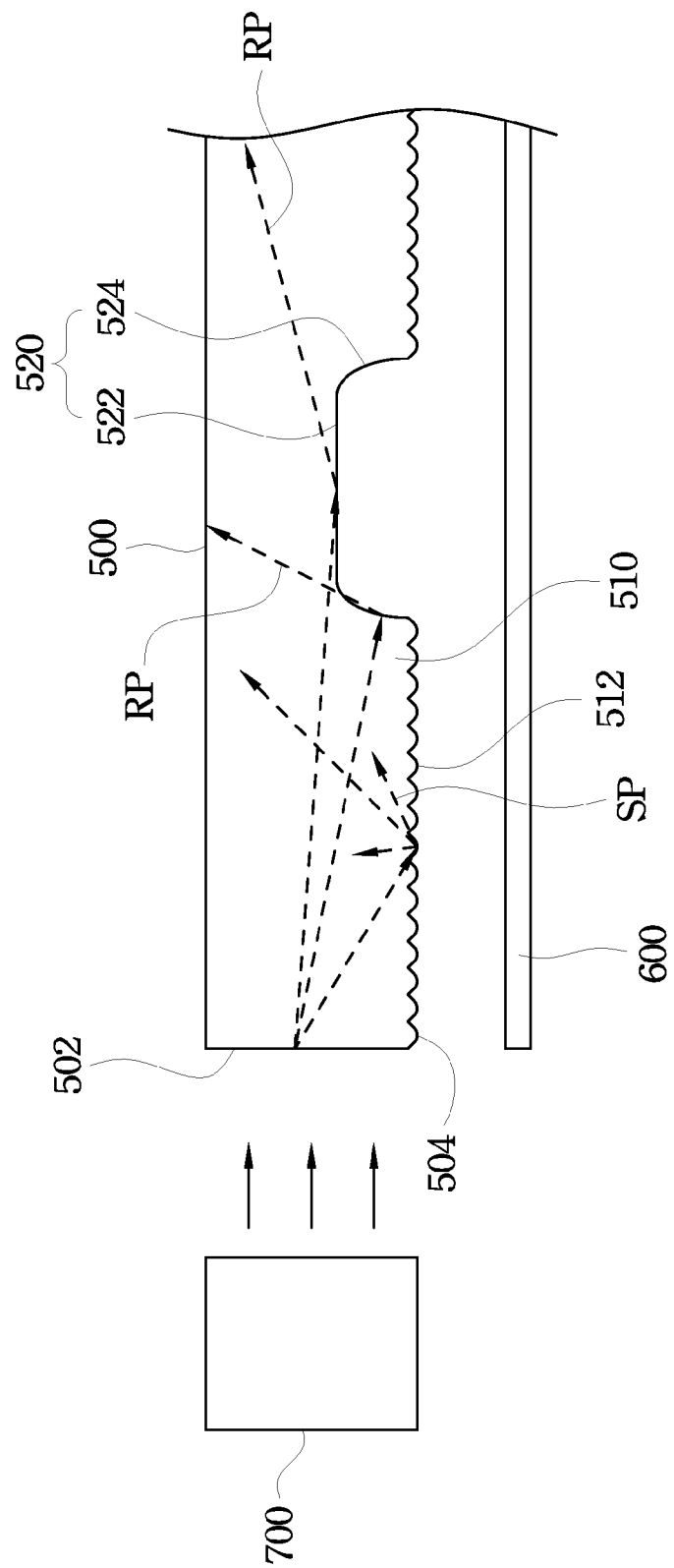
FIG. 3 is a cross sectional view of a backlight module having the light guide plate of FIG. 1G, in which hatches are omitted to clearly illustrate light paths.

FIG. 3 is a cross sectional view of a backlight module having the light guide plate 500 of FIG. 1G, in which hatches are omitted to clearly illustrate light paths. The backlight module includes at least one light source 700 and a light guide device. The light source 700 is for providing light to the light guide plate 500. The light guide device includes the light guide plate 500 and a reflector 600. The light guide plate 500 has a light entrance surface 502 and a light guiding surface 504. The light entrance surface 502 is opposite the light source 700. The light entrance surface 502 and the light guiding surface 504 share an edge of the light guide plate 500. The indented microstructure 520 is disposed in the light guiding surface 504. At least a part of the light guiding surface 504 surrounding the indented microstructure 520 is rough, i.e. the rough surface 512. The reflector 600 is disposed corresponding to the light guiding surface 504 of the light guide plate 500.

As shown in FIG. 3, the indented microstructure 520 has a flat bottom surface 522 and at least one curved surface 524. The flat bottom surface 522 is disposed in the light guide plate 500. The curved surface 524 is around the flat bottom surface 522 and extends from the flat bottom surface 522 to the light guiding surface 504 (or the rough surface 512).

As indicated by the reflected light pathes RP, a part of light, e.g. light incident on the curved surface 524, is reflected to be directed out of the light guide plate 500, and another other part of light, e.g. light incident on the flat bottom surface 522, is totally internally reflected to be transported further. As indicated by the scattering light pathes SP, light incident on the rough surface 512 is widely scattered.

Figure 4:
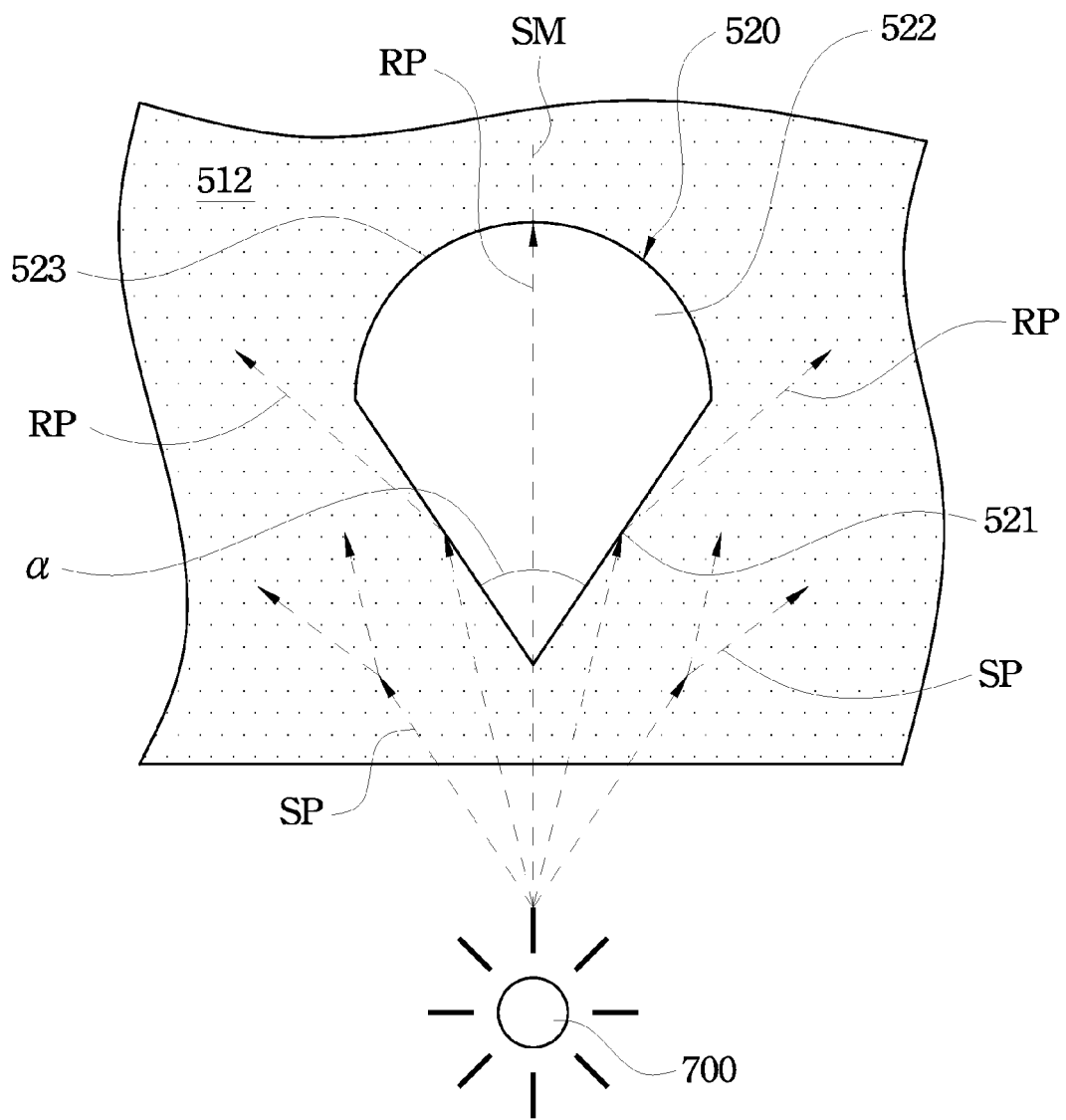
FIG. 4 is a bottom view of the indented microstructure of FIG. 1G.

FIG. 4 is a bottom view of the indented microstructure 520 of FIG. 1G. As shown in FIG. 4, the flat bottom surface 522 has an axis of symmetry SM aligning with the light source 700. Specifically, the flat bottom surface 522 has a tapered end, at least two substantially straight side edges 521, and an arc side edge 523. One end of each of the substantially straight side edges 521 terminates at the tapered end. The arc side edge 523 connects the other ends of the substantially straight side edges 521.

As indicated by the reflected light pathes RP, the substantially straight side edges 521 can reflect a part of light to a wider area when viewed from the bottom of the light guide plate 500. As indicated by the scattering light pathes SP, light incident on the rough surface 512 is widely scattered as well when viewed from the bottom of the light guide plate 500. In this configuration, the light from the light source 700 can be sufficiently diffused, and thus hot spots and dark spots are reduced.

An included angle α between the substantially straight side edges 521 is ranged from about 70 degrees to 180 degrees. Specifically, the included angle α is ranged from about 65 degrees to 110 degrees.

The arc side edge 523 is for eliminating jet mura, especially in the case where the light source 700 is a light emitting diode (LED). The arc side edge 523 is a segment of the circumference of a circle, and the length of the arc side edge 523 is less than the length of the semi-circumference of the circle.

Figure 5:
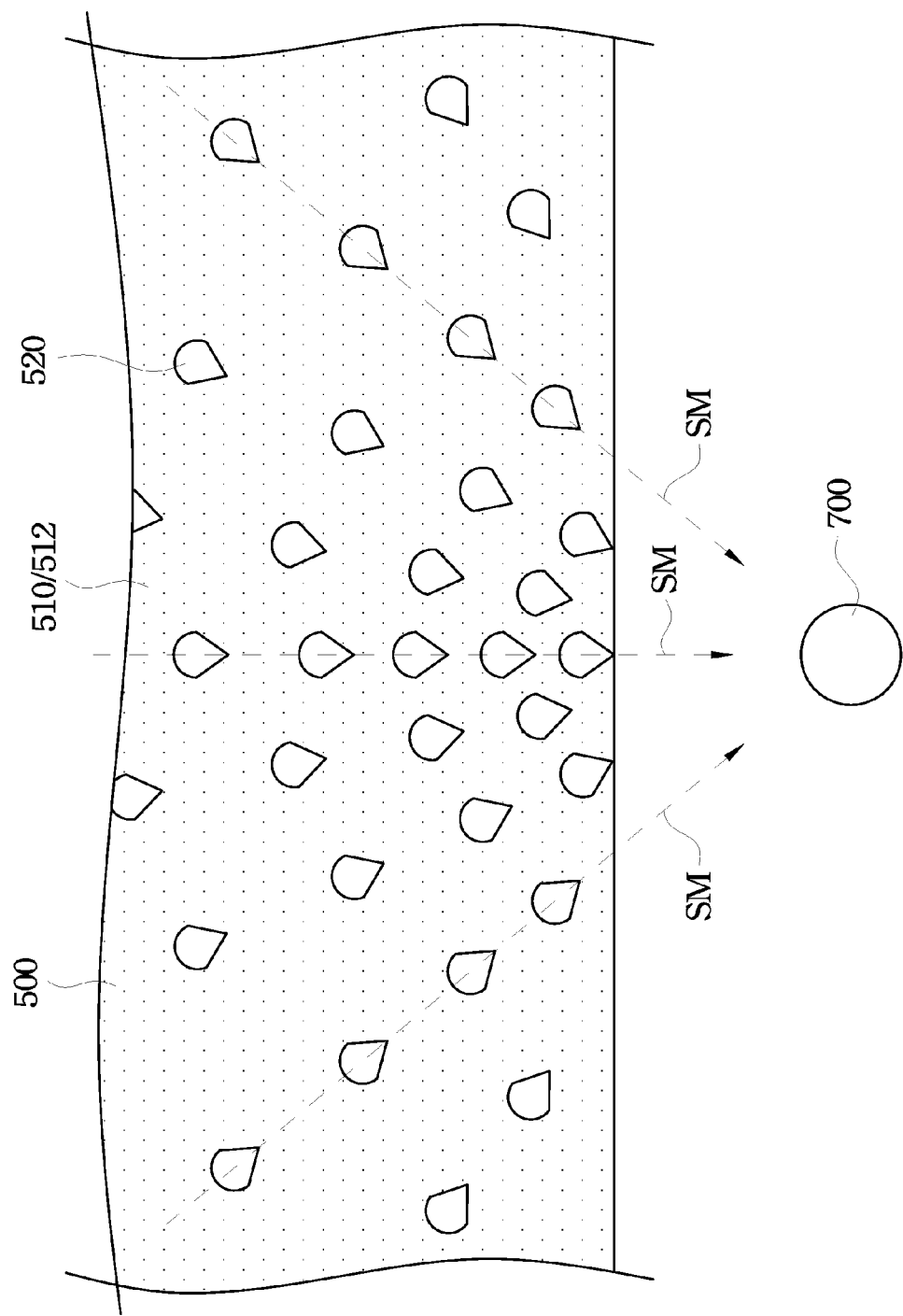
FIG. 5 is a bottom view of the light guide plate according to one embodiment of the present invention.

FIG. 5 is a bottom view of the light guide plate 500 according to one embodiment of the present invention. In the case where there is only one light source 700 providing light to the light guide plate 500, the axis of symmetry SM of each indented microstructure 520 is aligned with the light source 700. On the other hand, in the case where there are two or more light sources 700 providing light to the light guide plate 500, the axis of symmetry SM of each indented microstructure 520 is aligned with the nearest one of the light sources 700. For example, as shown in FIG. 6, the axis of symmetry SM of each indented microstructure 520 in the left half of the light guide plate 500 is aligned with the left light source 700, and the axis of symmetry SM of each indented microstructure 520 in the right half of the light guide plate 500 is aligned with the right light source 700.

In one or more embodiments of the present invention, the density of the indented microstructures 520 increases as the distance from the light source(s) 700 decreases. That is, the density of the indented microstructures 520 decreases as the distance from the light source(s) 700 increases since the hot spots or dark spots problem is naturally mitigated as the distance from the light source(s) 700 increases.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A method for manufacturing a light guide plate, the method comprising:
   defining at least one dot area and at least one non-dot area on a mask;
   performing a lithography and etching process using the mask a mold to form at least one recess having a rough surface on the mold and leave at least one non-etched microstructure on the mold, wherein the recess corresponds to the non-dot area, and the non-etched microstructure corresponds to the dot area; and
   performing an injection molding process using the mold to form the light guide plate, wherein the light guide plate has at least one protrusion having a rough surface on the light guide plate and at least one indented microstructure in the light guide plate, wherein the protrusion corresponds to the recess, and the indented microstructure corresponds to the non-etched microstructure.

2. The method for manufacturing the light guide plate as claimed in claim 1, wherein the mold is a male die.

3. The method for manufacturing the light guide plate as claimed in claim 1, wherein the indented microstructure of the light guide plate has a tapered end and at least two substantially straight side edges, one end of each of the substantially straight side edges terminating at the tapered end.

4. A light guide device comprising:
   a light guide plate having a light entrance surface, a light guiding surface sharing an edge of the light guide plate with the light entrance surface, and at least one indented microstructure disposed in the light guiding surface, wherein at least a part of the light guiding surface surrounding the indented microstructure is rough, and the indented microstructure has a flat bottom surface in the light guide plate and a plurality of side surfaces extending from all sides of the flat bottom surface in the light guiding surface; and
   a reflector disposed corresponding to the light guiding surface of the light guide plate.

5. The light guide device as claimed in claim 4, wherein the flat bottom surface of the indented microstructure has an axis of symmetry aligning with a light source which provides light to the light guide plate.

6. The light guide device as claimed in claim 4, wherein the flat bottom surface has a tapered end, at least two substantially straight side edges, one end of each of the substantially straight side edges terminating at the tapered end, and an arc side edge connecting the other ends of the substantially straight side edges.

7. The light guide device as claimed in claim 6, wherein an included angle between the substantially straight side edges is ranged from about 70 degrees to 180 degrees.

8. The light guide device as claimed in claim 6, wherein the arc side edge is a segment of the circumference of a circle, and the length of the arc side edge is less than the length of the semi-circumference of the circle.

9. The light guide device as claimed in claim 4, wherein a plurality of the indented microstructures are disposed in the light guiding surface, and the density of the indented microstructures increases as the distance from a light source which provides light to the light guide plate decreases.

10. A backlight module comprising:
    at least one light source; and
    a light guide device comprising:
    a light guide plate having a light entrance surface opposite the light source, a light guiding surface sharing an edge of the light guide plate with the light entrance surface, and at least one indented microstructure disposed in the light guiding surface, wherein at least a part of the light guiding surface surrounding the indented microstructure is rough, and the indented microstructure has a flat bottom surface in the light guide plate and a plurality of side surfaces extending from all sides of the flat bottom surface to the light guiding surface; and
    a reflector disposed corresponding to the light guiding surface of the light guide plate.

11. The backlight module as claimed in claim 10, wherein the flat bottom surface of the indented microstructure has an axis of symmetry aligning with the light source.

12. The backlight module as claimed in claim 10, wherein the flat bottom surface has a tapered end, at least two substantially straight side edges, one end of each of the substantially straight side edges terminating at the tapered end, and an arc side edge connecting the other ends of the substantially straight side edges.

13. The backlight module as claimed in claim 12, wherein an included angle between the substantially straight side edges is ranged from about 65 degrees to 110 degrees.

14. The backlight module as claimed in claim 12, wherein the arc side edge is a segment of the circumference of a circle, and the length of the arc side edge is less than the length of the semi-circumference of the circle.

15. The backlight module as claimed in claim 10, wherein a plurality of the indented microstructures are disposed in the light guiding surface, and the density of the indented microstructures increases as the distance from the light source decreases.

* * * * *